(12) United States Patent
Ishii

(10) Patent No.: US 7,147,104 B2
(45) Date of Patent: Dec. 12, 2006

(54) STORAGE CASING AND METHOD OF ASSEMBLING THE SAME

(75) Inventor: Hirohisa Ishii, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

(21) Appl. No.: 11/227,061

(22) Filed: Sep. 15, 2005

(65) Prior Publication Data
US 2006/0060482 A1    Mar. 23, 2006

(30) Foreign Application Priority Data
Sep. 17, 2004  (JP)  ............................... 2004-272445

(51) Int. Cl.
*B65D 85/57*    (2006.01)
(52) U.S. Cl. .................... 206/308.1; 206/312; 206/425
(58) Field of Classification Search ................ 206/1.5, 206/307, 307.1, 308.1, 308.3, 309, 311, 312, 206/425, 767; 229/101, 164, 117.01; 493/84, 493/86, 102, 162
See application file for complete search history.

(56) References Cited
U.S. PATENT DOCUMENTS

| | | | | |
|---|---|---|---|---|
| 1,375,794 A | * | 4/1921 | McSheehy | .................. 206/425 |
| 4,519,893 A | * | 5/1985 | Olas | ............................ 206/311 |
| 4,655,342 A | * | 4/1987 | Brauner et al. | .......... 206/308.3 |
| 4,759,443 A | * | 7/1988 | Egly | ........................... 206/425 |
| 5,344,004 A | * | 9/1994 | Meyer | ......................... 206/1.5 |
| 5,558,219 A | * | 9/1996 | Staubitz et al. | ........... 206/308.1 |

FOREIGN PATENT DOCUMENTS

JP    2001-97472    4/2001

* cited by examiner

*Primary Examiner*—Luan K. Bui
(74) *Attorney, Agent, or Firm*—Knobbe Martens Olson & Bear LLP

(57) ABSTRACT

By enlarging a range, in which an insertion and extraction port is opened, optical disks as stored are made easy to turn over to enable readily retrieve the optical disks as stored.

A storage casing includes a bottom plate, a front plate provided on the bottom plate through a first hinge composed of a first bent portion along a first side of the bottom plate, a back plate provided on the bottom plate through a second hinge composed of a second bent portion along a second side opposed to the first side, and a pair of side plates provided on the back plate. When the front plate turns through the first hinge, it turns until engaging parts of turning pieces of the front plate engage with first turning restriction portions, and when the back plate turns through the second hinge, it turns until restriction portions of the side plates engage with second turning restriction portions. The front plate and the back plate are opened outward to enlarge an insertion and extraction port.

10 Claims, 9 Drawing Sheets

STORAGE CASING AND METHOD OF ASSEMBLING THE SAME

BACKGROUND OF THE INVENTION

1. Field of the Invention

The present invention relates to a storage casing suitable for storing a plurality of thin articles being stored, in particular, optical information recording media such as optical disks, etc., and a method of assembling the storage casing.

2. Description of the Related Art

Being one of recording media that record an information signal, optical disks are not sold one by one, but are in many cases sold in a package, in which a plurality of optical disks are packed. Concretely, optical disks are sold in a state, in which optical disks are stored one by one in storage casings made of a transparent or translucent synthetic resin and having stiffness due to having a thickness of 4 mm to 10 mm, and a plurality of storage casings with optical disks stored therein are packed and wrapped up in a lump by heat shrinkable film or the like. In other sales configurations, a plurality of optical disks stacked with a spindle casing inserted through central holes of the optical disks are packed and wrapped up by heat shrinkable film or the like. Further, in other sales configurations, optical disks are stored one by one in sleeve casings being flexible and made of a transparent or translucent synthetic resin mixed with paper and nonwoven fabric, and a plurality of sleeve casings with optical disks stored therein are received in a single packing casing.

Optical disks owned every user are increased in number, so that it becomes troublesome to find out a desired optical disk. Storage casings having the stiffness and a thickness in the order of 10 mm include a backbone enabling writing thereon information related to recorded information signals, but the work of taking out a backbone from a storage casing is troublesome and such storage casings are not made use of in many cases. Storage casings having a thickness of less than 10 mm and made of a synthetic resin are thin, and cannot receive a backbone. Additionally, optical disks stored in a spindle casing and optical disks stored in a sleeve casing are not provided with paper for writing of memos.

On the other hand, when a user writes information, such as title, etc, related to recorded contents, directly on an optical disk, the user visually recognizes a title, which represents contents directly written on the optical disk, through a transparent or translucent storage casing and sleeve casing.

Storage casings with a recorded optical disk stored therein are in many cases stacked in a vertical or horizontal position to be stored in a packing casing. Also, optical disks stored in a sleeve casing continue in many cases to be stored in a packing casing been used since selling. When a packing casing is stored, optical disks put in a state of being stored in a storage casing or a sleeve casing are stacked in a vertical or horizontal position, so that when memos, such as title, etc, related to contents recorded in an optical disk are directly written on the optical disk, a region, in which memos are written, hides behind an adjacent storage casing or an adjacent sleeve casing to make retrieval hard. Also, in case of purchasing optical disks stored in a spindle casing, it is necessary to prepare a separate storage casing for the optical disks, which is troublesome.

Also, storage casings need an adhesive in assembly and include a plurality of parts to cause a problem that manufacturing processes are increased in number.

In addition, JP-A-2001-97472 discloses a storage casing for a recording medium. The JP-A-2001-97472 describes assembling a single sheet to assemble a storage casing storing therein a plurality of disk cartridges and taking in and out of disk cartridges through opening and closing a front plate, which is restricted in amount of turning by a pin being a separate member. With the disclosure of the JP-A-2001-97472, however, only the front plate turns and turning is performed only by the front plate, so that opening can be performed only in one direction at the time of retrieval to make opening insufficient in freedom, which makes it hard to turn over disk cartridges and difficult it to find out a desired disk cartridge from a plurality of disk cartridges stored in the storage casing.

In particular, in case of accommodating and storing an optical disk in a storage casing and a sleeve casing, which are thinner than a disk cartridge, the casings are increased in number, so that a range of turning is insufficient with only turning of the front plate as in the JP-A-2001-97472, thus making it difficult to confirm an indication applied on an optical disk itself and a desired optical disk. Further, the storage casing disclosed in the JP-A-2001-97472 is easily influenced by weight balance of disk cartridge therein. Further, the storage casing disclosed in the JP-A-2001-97472 substantially uses a pin for turning of the front plate, so that parts are plural in number and it is not possible to adequately achieve shortening of manufacturing processes.

For the reason described above, a selling and packaging configuration is demanded of a storage casing for optical disks to comprehensively take account of reduction in storage space, reduction of auxiliary supplies for arrangement and storage, reduction of labor for retrieval of a disk, reduction of waste packaging materials, and further reduction in cost.

SUMMARY OF THE INVENTION

The invention has been thought of in view of the problems discussed above and has its object to provide a storage casing that can hold thin stored articles therein in an upright position, achieve reduction in manufacturing processes and cost, enables easy visual observation of articles stored therein in spite of large and small amounts of articles stored therein, and makes retrieval of stored articles very easy, and a method of assembling the storage casing.

Specifically, it is an object of the invention to provide a storage casing, in which an insertion and extraction port is enlarged in a range of opening to make it easy to turn over thin stored articles and thin stored articles, in particular, optical information recording media can be readily retrieved, and a method of assembling the storage casing.

Also, it is an object of the invention to provide a storage casing having a construction, which is completed by simply assembling a single sheet body to enable simplifying manufacturing processes, and a method of assembling the storage casing.

Further, it is an object of the invention to provide a storage casing, in which cardboard makes a sheet body to enable achieving further reduction in cost, and a method of assembling the storage casing.

Further, it is an object of the invention to provide a storage casing, which enables a user to use a packaging casing as a filing casing as it is to make effective use of a packaging member, and a method of assembling the storage casing.

A storage casing according to the invention comprises a storage casing for a recording medium, storing therein a thin stored article in an upright position, the storage casing comprising a bottom plate, a front plate provided on the bottom plate with a first hinge, which is composed of a first bent portion along a first side of the bottom plate, therebetween, a back plate provided on the bottom plate with a second hinge, which is composed of a second bent portion along a second side opposed to the first side, therebetween, and a pair of side plates provided on the back plate. The front plate is provided with turning pieces along the side plates, the bottom plate is provided with turning restriction pieces along the side plates, and the turning restriction pieces are provided on sides thereof toward the back plate with first turning restriction portions, which engage with engaging parts of the turning pieces, and on sides thereof toward the front plate with second turning restriction portions, which engage with restriction portions provided on side edges of the side plates adjacent to the front plate. When turning through the first hinge, the front plate can turn until the engaging parts of the turning pieces of the front plate engage with the first turning restriction portions, and when turning through the second hinge, the back plate can turn until the restriction portions of the side plates engage with the second turning restriction portions.

The storage casing comprises, for example, a single sheet body comprising a bottom plate, a front plate provided on a first side of the bottom plate with a first bent portion therebetween, a back plate provided on a second side of the bottom plate opposed to the first side with a second bent portion therebetween, a pair of side plates provided on third and fourth sides of the back plate adjacent to the second bent portion with third and fourth bent portions therebetween, turning pieces provided on fifth and sixth sides adjacent to the first bent portion of the front plate with fifth and sixth bent portions therebetween, and provided on tip ends thereof with engaging parts, turning restriction pieces provided on seventh and eight sides adjacent to the first and second sides of the bottom plate with seventh and eight bent portions therebetween, and provided on tip ends thereof with restriction pieces, with ninth and tenth bent portions, which are in parallel to the seventh and eight bent portions, therebetween, and holding pieces provided on the side plates with eleventh and twelfth bent portions, which are in parallel to the third and fourth bent portions, therebetween. Also, the third and fourth bent portions are provided with latch holes, and the eleventh and twelfth bent portions are provided with insertion ports.

The storage casing is assembled by bending the turning restriction pieces at the seventh and eight bent portions and bending the restriction pieces at the ninth and tenth bent portions to form folds, and bending the pair of side plates at the third and fourth bent portions. Subsequently, the back plate is bent at the second bent portion so that the turning restriction pieces are positioned inside the side plates, and the holding pieces are bent at the eleventh and twelfth bent portions so as to surround the turning restriction pieces to put the restriction pieces formed with the folds in a state of being separate from the side plates. Subsequently, the turning pieces are bent at the fifth and sixth bent portions, the front plate is bent at the first bent portion, and the bent turning pieces are inserted from the insertion ports of the eleventh and twelfth bent portions. Subsequently, the storage casing is assembled by further folding the bent holding pieces at the eleventh and twelfth bent portions, and latching latch portions of the holding pieces in the latch holes of the third and fourth bent portions.

According to the invention, when turning through the first hinge, the front plate can turn until the engaging parts of the turning pieces of the front plate engage with the first turning restriction portions and when turning through the second hinge, the back plate can turn until the restriction portions of the side plates engage with the second turning restriction portions, so that the insertion and extraction port for a thin stored article can be enlarged by opening the front plate and the back plate outward. Accordingly, thin stored articles can be held in an upright position, and display of thin stored articles and thin stored articles themselves become easy to confirm, thus making retrieval very easy. Further, when the insertion and extraction port is opened, weight balance is made such that a plurality of thin stored articles inside can be distributed to the front plate side and the back plate side, so that it is possible to adjust an opening width with good balance.

In other words, in finding out a desired thin stored article out of thin stored articles stacked in the storage part, it is possible to enlarge an interval between adjacent thin stored articles, thus easily enabling visual observation of, for example, memos on surfaces of the thin stored articles to make retrieval easy. The invention is excellent in quality of retrieval, productivity, and quality of use to be especially suited to thin stored articles, such as optical information recording media, with display on one surface thereof. Also, the invention can be constructed by assembling a single sheet body, so that it is possible to simplify an assembling process owing to reduction of parts in number and to achieve reduction in manufacturing cost.

DESCRIPTION OF CERTAIN EMBODIMENTS

Certain innovative embodiments of a storage casing will be described below with reference to the drawings.

Figure 1:
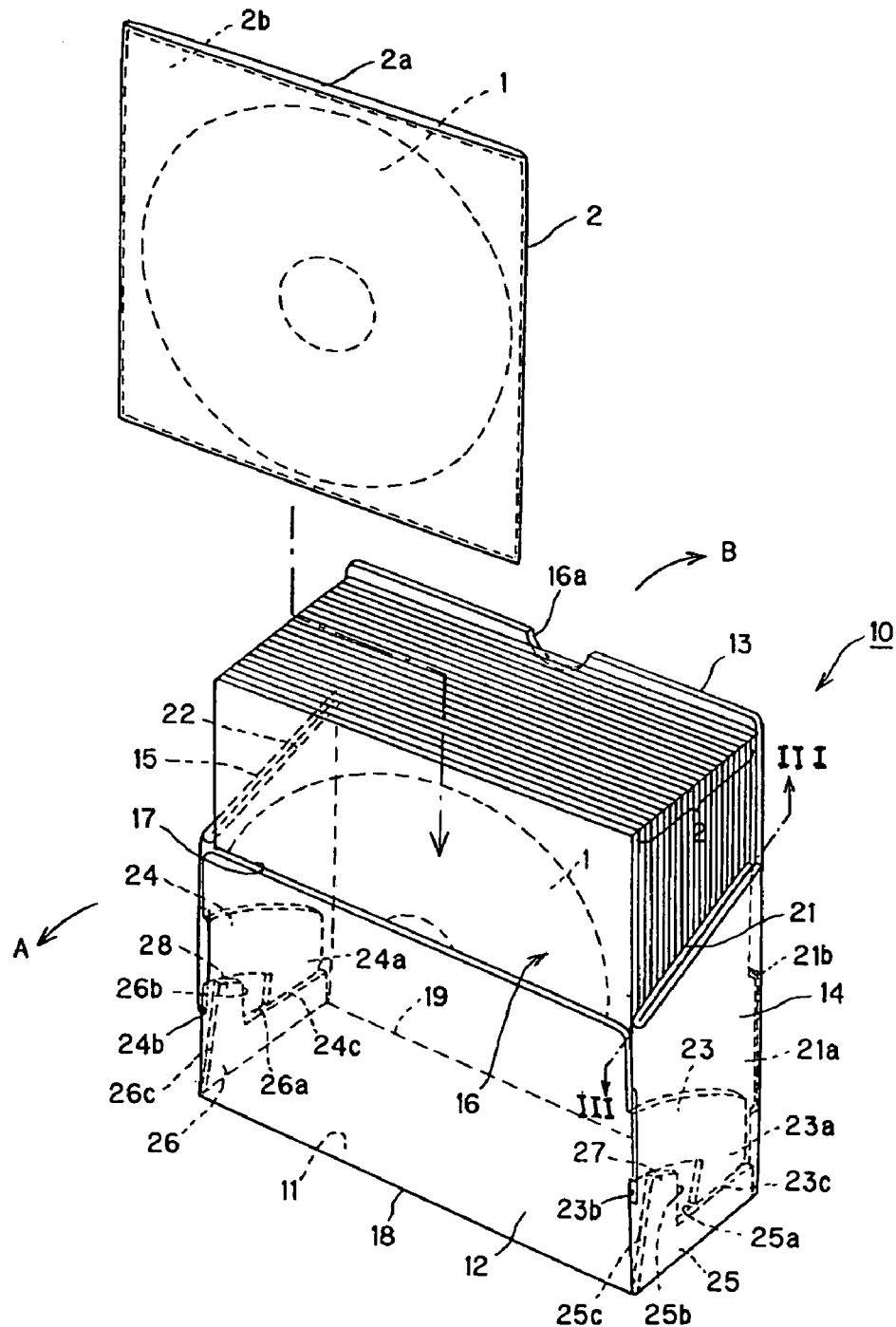
FIG. 1 is a perspective view showing a storage casing for optical disks, to which the invention is applied.
Figure 2:
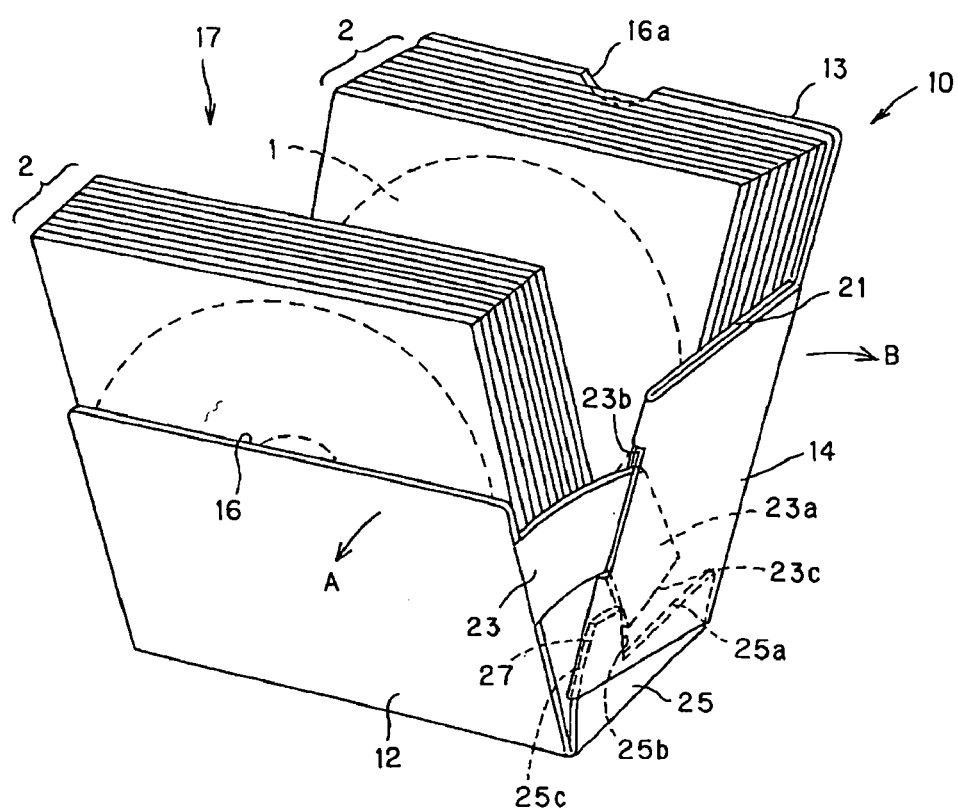
FIG. 2 is a perspective view showing a state, in which the storage casing is opened.

A storage casing 10, to which the invention is applied, shown in FIGS. 1 and 2 stores therein a plurality of optical disks 1 being thin stored articles, and the whole storage casing 10 is packed and wrapped up by heat shrinkable film and displayed at the time of shipping and over the counter sale, the storage casing functioning as a filing casing that permits a user to store and keep therein a plurality of optical disks in use after being purchased by the user.

The optical disks 1 stored in the storage casing can include an optical disk having, for example, a diameter of 12 cm, and more specifically, a write once type CD or rewritable CD (Compact Disc), DVD (Digital Versatile Disk), etc. The optical disks 1, respectively, in a state of being stored in a sleeve casing 2, which is substantially rectangular in shape and formed on a side thereof with an insertion inlet 2a, are stored in a state of being stacked in a vertical position in the storage casing 10. The sleeve casing 2 is formed by fusing three sides of a sheet body made of a transparent or translucent synthetic resin such as polypropylene, etc. and having flexibility, and formed on a side thereof with an insertion inlet 2a of optical disks 1. The storage casing 10 can store, for example, twenty optical disks 1 in a state, in which the optical disks 1 are stored in the sleeve casings 2.

A user frequently makes a note of information, such as title, etc., relating to recorded contents on a non-signal recorded surface opposed to a signal recorded surface of the optical disk 1. The sleeve casing 2 is formed to be transparent or translucent whereby a note recorded by a user can be recognized from outside. Also, paper or nonwoven fabric 2b is stored in the sleeve casing 2 to protect the signal recorded surface of the optical disk 1.

The sleeve casing 2 described above is a thin one among existing storage casings for the optical disks 1. By storing the thin sleeve casings 2 in a state of being stacked in a vertical position, the storage casing 10 according to the invention can store therein many optical disks 1.

In addition, an article being stored in the storage casing 10 is not limited to a recording medium such as the optical disks 1 but is not limitative provided that it is a thin plate-shaped body. Also, when a stored article is a recording medium, it is not limited to an optical information recording medium such as CD, DVD, etc. described above but may be a disk cartridge, which stores an optical disk, a magneto-optic disk, a magnetic disk, etc., an IC card with a semiconductor memory used for a storage element, and the like. A disk cartridge, an IC card, or the like, of which a recording medium is not exposed outside directly, must not necessarily be stored in the storage casing 10 in a state of being stored in a casing, such as the sleeve casing 2, which protects a recording medium.

The storage casing 10, in which the optical disk 1 in a state of being stored in the sleeve casing 2 is stored, comprises, as shown in FIGS. 1 and 2, a substantially rectangular-shaped bottom plate 11, a front plate 12 provided integrally on one of long sides of the bottom plate 11, a back plate 13 provided integrally on the other of the long sides of the bottom plate 11, and a pair of side plates 14, 15 provided integral with the back plate 13, the storage casing being formed therein with a storage part 16, in which 20 optical disks stored in the sleeve casing 2 are stored at maximum.

In addition, the maximum number of optical disks as stored is not limited to 20 but may be more or less than 20, which case can be coped with by changing a thickness of the storage part 16.

The front plate 12 is formed to be lower than the back plate 13 and also lower than the sleeve casing 2 stored in the storage part 16, so that a substantially upper one third of the sleeve casing 2 stored in the storage part 16 is exposed to the front whereby the sleeve casing 2 stored in the storage part 16 and receiving therein the optical disk 1 is made easy to visually observe. That is, with the storage casing 10, the transparent or translucent sleeve casings 2 with the optical disks 1 stored therein are made liable to move or be moved, thus facilitating visual observation of a note related to recorded contents and written on a non-signal recorded surface of the optical disk 1 through the sleeve casing 2. Also, the back plate 13 is formed to be substantially the same in height as, or slightly lower than the sleeve casing 2 so that the sleeve casing 2 stored in the storage part 16 can be stored stably. A notch 16a is formed substantially centrally of an upper end of the back plate 13 so as to enable facilitating taking-out and putting-in of the sleeve casing 2 stored in the storage part 16.

The side plates 14, 15, are formed to be substantially the same in height as the front plate 12 at the front sides thereof and to be increased in height toward the back plate 13. The side plates 14, 15 are formed such that upper ends thereof are increased in height toward the back from the front, whereby the side plates and the back plate 13 make it possible to stably store a plurality of the sleeve casings 2 in the storage part 16. Also, back sides of the side plates 14, 15 are not made the same in height as the back plate 13 but formed to be somewhat lower than the back plate. Thereby, with the storage casing 10, when the sleeve casings 2 are, for example, sorted by color to be stored in the storage part 16, a sleeve casing 2 with a desired optical disk 1 stored therein can be readily found amongst the sleeve casings 2 in a stacked state.

The storage casing 10 having such external form is opened at a top, an upper portion of the front, and upper portions of the both sides to define an insertion and extraction port 17, through which insertion and extraction of the sleeve casings 2 are performed.

With the storage casing 10, a first bent portion formed by the bottom plate 11 and the front plate 12 defines, as shown in FIG. 2, a first hinge 18 that permits the front plate 12 to turn forwardly of the bottom plate 11, that is, in a direction of an arrow A in FIGS. 1 and 2. Also, a second bent portion formed by the bottom plate 11 and the back plate 13 defines a second hinge 19 that permits the back plate 13 to turn rearward, that is, in a direction of an arrow B in FIGS. 1 and 2. With the storage casing 10, the front plate 12 turns forward a predetermined angle, for example, 15°, the back plate 13 turns rearward a predetermined angle, for example, 15°, and thus the insertion and extraction port 17 is opened 30° in total, whereby insertion and extraction of the sleeve casings 2 are made easy to perform and the sleeve casings 2 with the optical disks 1 stored therein are made liable to move or be moved, thus making it possible to readily retrieve the optical disks 1 as stored.

In addition, a turning angle of the front plate 12 and a turning angle of the back plate 13 are not limited to the angles described above and a turning angle of the front plate 12 and a turning angle of the back plate 13 may be different from each other. Also, turning angles of the front plate 12 and the back plate 13 can be appropriately changed depending upon a shape, a size, and a weight of a stored article, or the like.

The side plates 14, 15 are further provided therein with holding pieces 21, 22 to make sides of the storage casing 10 double-structured. Provided between the side plates 14, 15 and the holding pieces 21, 22 are turning pieces 23, 24 provided midway on both side edges of the front plate 12 and turning restriction pieces 25, 26 provided on both side edges of the bottom plate 11, so that turning of the front plate 12 and turning of the back plate 13 are performed with the turning pieces 23, 24 and the turning restriction pieces 25, 26.

Figure 3:
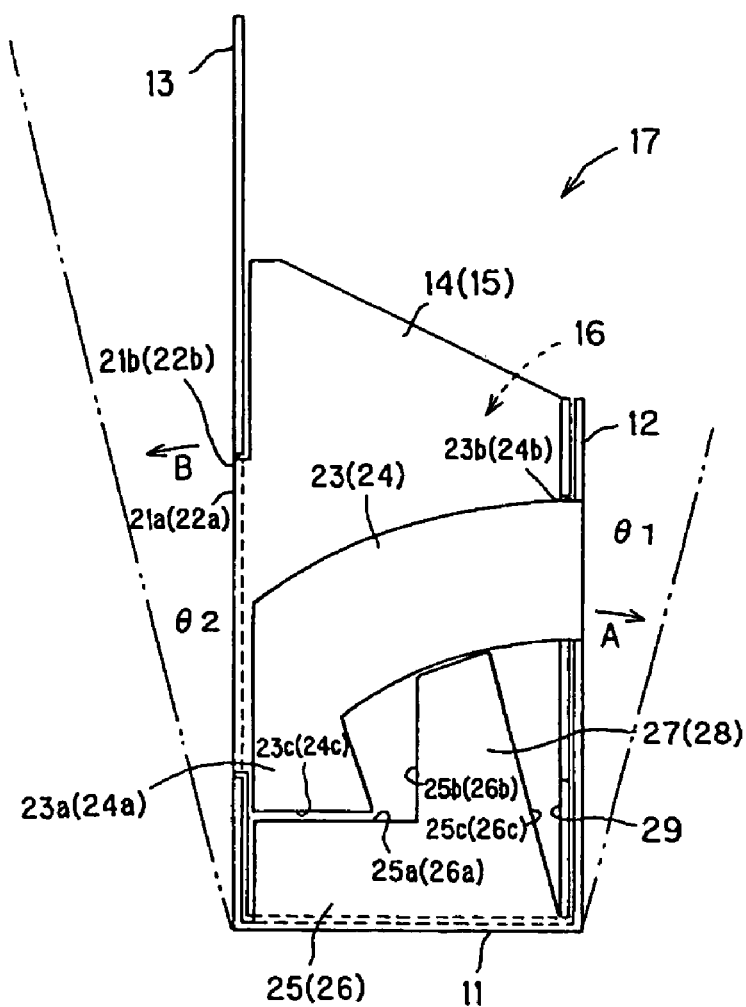
FIG. 3 is a cross sectional view taken along the line III—III in FIG. 1.

As shown in FIGS. 1 to 3, the turning pieces 23, 24 are integrally provided midway on both side edges of the front plate 12 to be bent substantially 90° along the side plates 14, 15. The turning pieces 23, 24 are formed to be curved downward, and formed at tip ends thereof with engaging parts 23a, 24a for engagement with the turning restriction pieces 25, 26. The turning pieces 23, 24 are inserted between the side plates 14, 15 and the holding pieces 21, 22 from insertion ports 23b, 24b provided on bent portions of the side plates 14, 15 and the holding pieces 21, 22.

The turning restriction pieces 25, 26 are integrally provided on opposite short sides of the bottom plate 11 to be bent upward substantially 90°. Restriction pieces 27, 28 are further provided integrally on a side of the turning restriction pieces 25, 26 toward the front plate 12 in a direction of extension of the turning restriction pieces. The turning restriction pieces 25, 26 and the restriction pieces 27, 28 contiguous to and integral with the turning restriction pieces 25, 26 are inserted between the side plates 14, 15 and the holding pieces 21, 22.

Upper ends 25a, 26a of the turning restriction pieces 25, 26, on which the restriction pieces 27, 28 are not provided, are caused to abut against tip end surfaces 23c, 24c of the engaging parts 23a, 24a of the turning pieces 23, 24 when the front plate 12 turns in an opposite direction to the direction of the arrow A in FIGS. 1 to 3 to be put in a state of being substantially perpendicular to the bottom plate 11, whereby the front plate 12 is prevented to turn to excess inward in the opposite direction to the direction of the arrow A in FIGS. 1 to 3. Side edges of the restriction pieces 27, 28 contiguous to the upper ends 25a, 26a of the turning restriction pieces 25, 26 and toward the back plate 13 define first turning restriction portions 25b, 26b, with which the engaging parts 23a, 24a of the turning pieces 23, 24 engage. The first turning restriction portions 25b, 26b are engaged by insides of the engaging parts 23a, 24a of the turning pieces 23, 24 to restrict thereby an amount of turning of the front plate 12. Specifically, the first turning restriction portions 25b, 26b permit the front plate 12 to turn relative to the bottom plate 11 by a turning angle θ1 (for example, 15°) in FIG. 3.

Side edges of the turning restriction pieces 25, 26 and the restriction pieces 27, 28 toward the front plate 12 are formed to be continuous and to define a straight line, and further formed to be inclined toward the back plate 13 to define second turning restriction portions 25c, 26c that restrict an amount of turning of the back plate 13. The second turning restriction portions 25c, 26c abut against restriction portions 29 inside bent portions of the side plates 14, 15 and the holding pieces 21, 22 to permit the back plate 13 to turn relative to the bottom plate 11 by a turning angle θ2 (for example, 15°) in FIG. 3 when the back plate 13 turns relative to the bottom plate 11 in the direction of the arrow B in FIGS. 1 to 3.

The holding pieces 21, 22 cooperating with the side plates 14, 15 to interpose therebetween the turning restriction pieces 25, 26 and the restriction pieces 27, 28 are provided at tip ends thereof with latch portions 21a, 22a, so that the latch portions 21a, 22a are latched in latch holes 21b, 22b, which are provided on bent portions of the back plate 13 and the side plates 14, 15, to be held in a substantially parallel to the side plates 14, 15. Thereby, the turning pieces 23, 24 and the turning restriction pieces 25, 26 are interposed between the side plates 14, 15 and the holding pieces 21, 22, and the turning pieces 23, 24 and the turning restriction pieces 25, 26 are made to surely engage with and disengage from each other, so that it is possible to surely restrict amounts of turning of the front plate 12 and the back plate 13. In addition, the turning pieces 23, 24, the turning restriction pieces 25, 26, and the holding pieces 21, 22 may be provided only on either of the sides provided that the front plate 12 and the back plate 13 can be pivotally supported with a sufficient strength.

As shown in FIG. 2, with the storage casing 10, one of the front plate 12 and the back plate 13 can be opened outward with the first hinge 18 or the second hinge 19 as a pivot, but the insertion and extraction port 17 can be opened further by opening both the front plate 12 and the back plate 13 outward. Thereby, the storage casing 10 makes it possible to cause the sleeve casings 2, which store the optical disks 1 therein and are stored in the storage part 16, to be inclined and easily turned over one by one and to increase a spacing between adjacent sleeve casings 2 when a sleeve casing 2 is turned over, so that it is possible to facilitate visual observation of a note or the like related to recorded contents and written on a non-signal recorded surface of the optical disk 1. Also, in a state, in which the insertion and extraction port 17 is opened, the stored sleeve casings 2 can be inclined and distributed to the front plate 12 and the back plate 13 whereby the storage casing 10 can be readily varied in weight balance.

Figure 4:
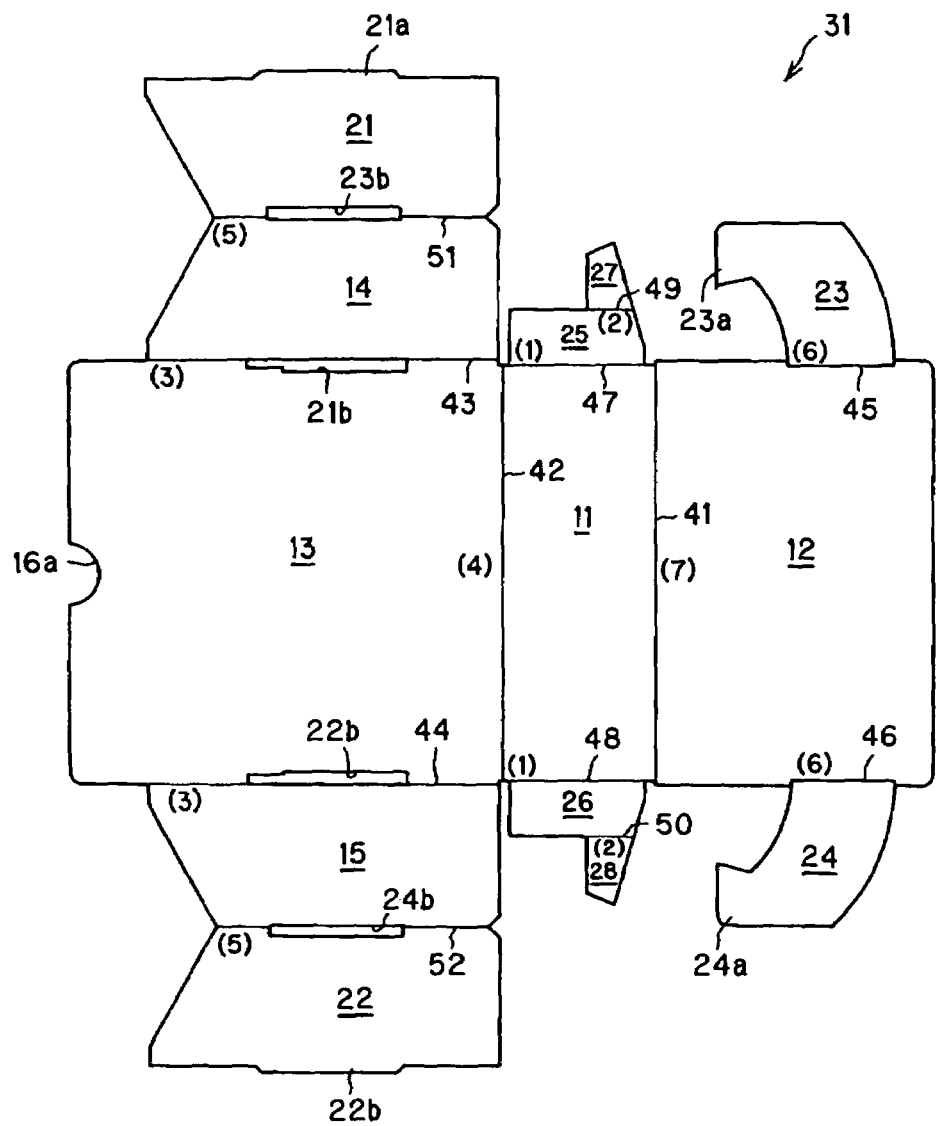
FIG. 4 is a development showing the storage casing.

By the way, while the storage casing 10 may be composed of plural parts and assembled with the use of an adhesive, an adhesive member such as adhesion tape, or the like, it may be formed by assembling a single sheet body 31 as shown in FIG. 4. Here, the sheet body 31 is formed from cardboard while it may also be made from a synthetic-resin sheet or the like. In this manner, when the storage casing 10 is composed of the single sheet body 31, it is possible to achieve reduction in number of parts and to facilitate assembly. Also, the storage casing 10 formed from cardboard is made easily disposable by cutting, dissolution, etc., as compared with the case where it is made from a synthetic-resin sheet body.

FIG. 4 shows an embodiment of the storage casing 10. As shown in FIG. 4, the sheet body 31 is provided centrally thereof with the substantially rectangular-shaped bottom plate 11. The substantially rectangular-shaped front plate 12 is formed on one of the long sides of the bottom plate 11 with a first bent portion 41 therebetween. The first bent portion 41 defines the first hinge 18 of the front plate 12. Also, the substantially rectangular-shaped back plate 13 is formed on the other of the long sides of the bottom plate 11 with a second bent portion 42 therebetween. The second bent portion 42 defines the second hinge 19 of the back plate 13. Further, the side plates 14, 15 are formed on third and fourth sides adjacent to the second bent portion 42 of the back plate 13 with third and fourth bent portions 43, 44 therebetween. The third and fourth bent portions 43, 44 are formed midway thereof with the latch holes 21b, 22b, in which the latch portions 21a, 22a of the holding pieces 21, 22 are latched. The latch holes 21b, 22b are formed to be the same as, or somewhat narrower than a thickness of the latch portions 21a, 22a, and permit the latch portions 21a, 22a to be press fitted therein, thus enabling sure latching the latch portion 21a, 22a.

The turning pieces 23, 24 are formed on fifth and sixth sides adjacent to the first bent portion 41 of the front plate 12 with fifth and sixth bent portions 45, 46 therebetween. The engaging parts 23a, 24a are formed on tip ends of the turning pieces 23, 24. Further, the turning restriction pieces 25, 26 are formed on seventh and eight short sides adjacent to the first and second bent portions 41, 42 of the bottom plate 11 with seventh and eight bent portions 47, 48 therebetween. The restriction pieces 27, 28 are formed on tip end sides of the turning restriction pieces 25, 26 with ninth and tenth bent portions 49, 50, which are in parallel to the seventh and eight bent portions 47, 48, therebetween. Further, the holding pieces 21, 22 are formed on the side plates 14, 15 with eleventh and twelfth bent portions 51, 52, which are in parallel to the third and fourth bent portions 43, 44, therebetween. The eleventh and twelfth bent portions 51, 52 are formed midway thereof with the insertion ports 23b, 24b, into which the turning pieces 23, 24 are inserted. The insertion ports 23b, 24b are formed to be somewhat wider than a thickness of the turning pieces 23, 24, thus permitting the turning pieces 23, 24 to smoothly move. Also, the latch portions 21a, 22a are formed on those sides of the holding pieces 21, 22, which are in parallel to the eleventh and twelfth bent portions 51, 52.

Subsequently, an explanation will be given to a method of assembling the storage casing 10.

First, as shown by (1) in FIG. 4, the turning restriction pieces 25, 26 are bent inward through the seventh and eight bent portions 47, 48, and the restriction pieces 27, 28 are bent inward through the ninth and tenth bent portions 49, 50 to form folds as shown by (2) in FIG. 4.

The side plates 14, 15 are then bent inward through the third and fourth bent portions 43, 44 as shown by (3) in FIG. 4.

Figure 5:
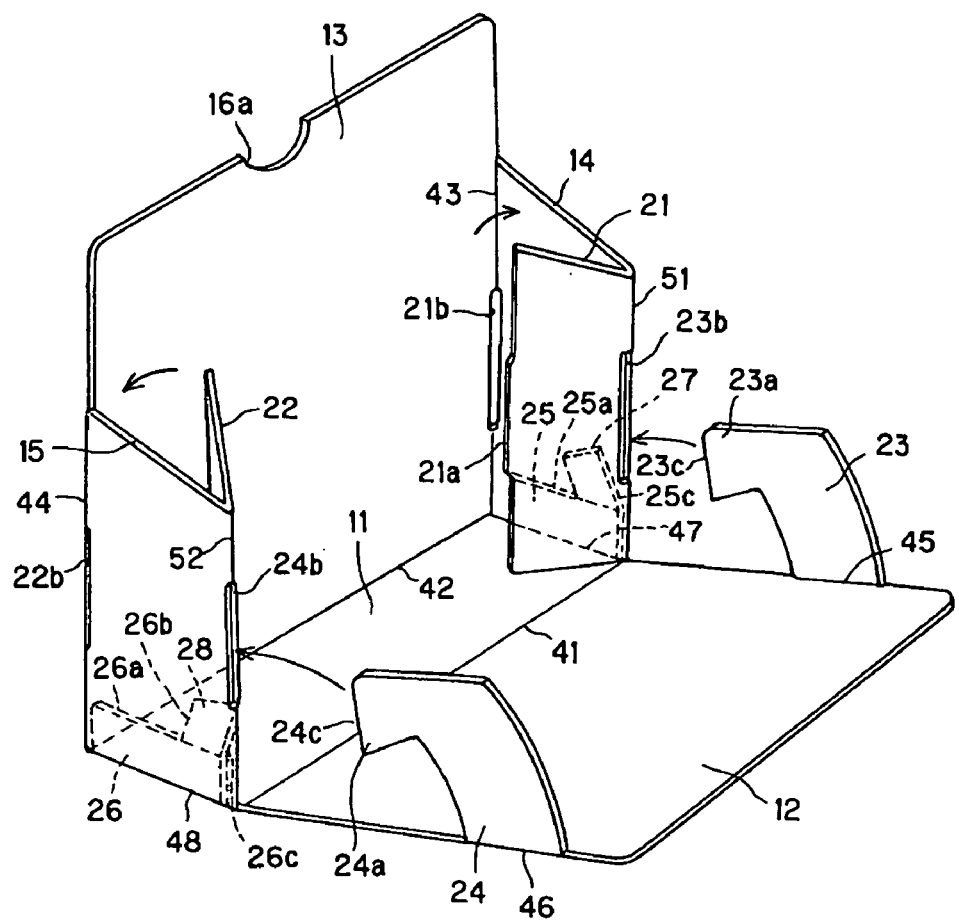
FIG. 5 is a perspective view showing a state, in which the storage casing is in the course of assembly.

The back plate 13 is then bent at the second bent portion 42 so that the turning restriction pieces 25, 26 are positioned inside the side plates 14, 15 as shown by (4) in FIG. 4. Further, as shown by (5) in FIG. 4, the holding pieces 21, 22 are bent midway at the eleventh and twelfth bent portions 51, 52 in a manner to interpose therebetween the turning restriction pieces 25, 26, thus attaining the state as shown in FIG. 5. That is, since the restriction pieces 27, 28 have folds at the ninth and tenth bent portions 49, 50, they are bent further inward relative to the turning pieces 23, 24 to be put in a state of being separate from the side plates 14, 15.

Then, as shown by (6) in FIG. 4 and in FIG. 5, the turning pieces 23, 24 are bent inward at the fifth and sixth bent portions 45, 46 and the front plate 12 is bent inward at the first bent portion 41 as shown by (7) in FIG. 4. In keeping with this, the turning pieces 23, 24 are inserted into the insertion ports 23b, 24b, which are formed at the eleventh and twelfth bent portions 51, 52 between the side plates 14, 15 and the holding pieces 21, 22, with the engaging parts 23a, 24a thereof as ends of insertion as shown in FIG. 5. At this time, since the restriction pieces 27, 28 have folds at the ninth and tenth bent portions 49, 50 and are put in a state of being separate from the side plates 14, 15, the engaging parts 23a, 24a can be smoothly inserted to sides of the restriction pieces 27, 28 toward the back plate 13 without striking on the restriction pieces 27, 28.

Thereafter, the holding pieces 21, 22 having been bent midway are further folded toward the side plates 14, 15 so that the restriction pieces 27, 28 having folds are caused to strike against the side plates 14, 15 and the latch portions 21a, 22a of the holding pieces 21, 22 are latched in the latch holes 21b, 22b provided on the third and fourth bent portions 43, 44.

According to the method, as shown in FIG. 5, after the restriction pieces 27, 28 contiguous to tip ends of the turning restriction pieces 25, 26 are caused to have folds at the bent portions 49, 50, the holding pieces 21, 22 are bent midway in a manner to cooperate with the side plates 14, 15 to interpose therebetween the turning restriction pieces 25, 26 and the restriction pieces 27, 28, and then the turning pieces 23, 24 are inserted into the insertion ports 23b, 24b on the eleventh and twelfth bent portions 51, 52, so that the turning pieces 23, 24 can be inserted to sides of the restriction pieces 27, 28 toward the back plate 13 without striking on the turning restriction pieces 25, 26 and the restriction pieces 27, 28. In a final process, the restriction pieces 27, 28 with folds are caused to strike against the side plates 14, 15 to latch the latch portions 21a, 22a of the holding pieces 21, 22 in the latch holes 21b, 22b provided on the third and fourth bent portions 43, 44, so that it is possible to assemble the storage casing 10, which eliminates displacement of the turning pieces 23, 24 and the turning restriction pieces 25, 26 in directions of bending to enable sure engagement and disengagement and can surely restrict amounts of turning of the front plate 12 and the back plate 13.

Here, since the insertion ports 23b, 24b, into which the turning pieces 23, 24 are inserted, are formed to be wider than a thickness of the turning pieces 23, 24, turning manipulation of the front plate 12 and the back plate 13 can be smoothly performed. Also, since the latch holes 21b, 22b, which are provided on the third and fourth bent portions 43, 44 between the back plate 13 and the side plates 14, 15 and in which the latch portions 21a, 22a of the holding pieces 21, 22 are latched, are formed to be narrower than a thickness of the latch portions 21a, 22a, it is possible to surely latch the latch portions 21a, 22a and it is accordingly possible to prevent disassembly of the storage casing 10 while in use.

Since the storage casing 10 assembled in the above manner and shown in FIGS. 1 and 2 is structured such that the front plate 12 is independently opened outward with the first hinge 18, which is defined by the first bent portion 41, as a pivot, and the back plate 13 is independently opened outward with the second hinge 19, which is defined by the second bent portion 42, as a pivot, it is possible to enlarge the insertion and extraction port 17. Accordingly, the sleeve casings 2, which store the optical disks 1 therein and are stacked and stored in the storage part 16, can be easily moved one by one when a user performs retrieval, and a spacing between adjacent sleeve casings 2 can be enlarged, so that it is also possible to facilitate visual observation of a note or the like related to recorded contents and written on a non-signal recorded surface of the optical disk 1.

Also, when the insertion and extraction port 17 is opened in a state, in which a plurality of sleeve casings 2 storing the optical disks 1 therein are stored, the stored sleeve casings 2 are inclined and distributed to the front plate 12 and the back plate 13. Accordingly, articles stored in the storage casing 10 can be readily varied in weight balance, and the insertion and extraction port 17 can be freely varied in opening width, thus facilitating handling.

Also, since the storage casing 10 is assembled by the use of a single cardboard, the user can readily dispose of it as combustible refuse when the storage casing 10 is damaged. Also, since the storage casing 10 is made of cardboard, there is no fear of breakage at the time of shipment or the like and it is possible to keep from use of synthetic resins, recycling of which is hard. Also, since the storage casing 10 is made of the single sheet body 31, it is possible to achieve reduction in number of parts and to facilitate assembly.

Also, since the storage casing 10 is stored in the storage part 16 in a state, in which an optical disk is stored in the sleeve casing 2 being a thin one among existing storage casings, it can store many optical disks 1.

In this manner, the storage casing 10 functions as a filing casing continuously used by a user to store the optical disks 1 also after it is purchased by the user, and additionally functions as a package casing when a plurality of optical disks 1 are packaged and sold by heat shrinkable film.

Figure 6:
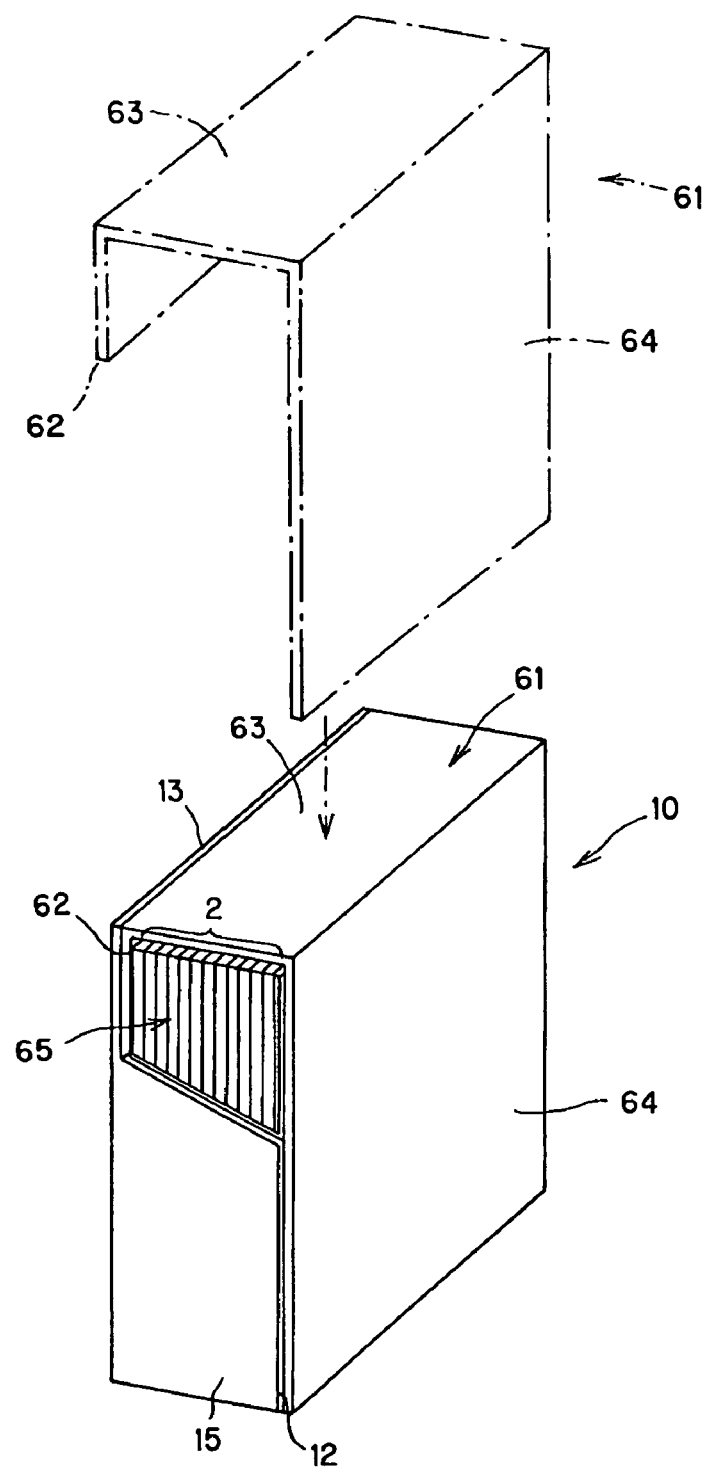
FIG. 6 is a perspective view showing a state of closure caused by a lid body, which is separate from a storage casing.

For example, as shown in FIG. 6, the insertion and extraction port 17 is closed by a lid body 61, which is a member separate from the storage casing 10, over the counter sale. The lid body 61, as the storage casing 10, is also formed from a single sheet body such as cardboard, etc. The sheet body comprises an insertion plate 62 being substantially rectangular-shaped and inserted between the back plate 13 and the sleeve casing 2 stored in the storage part 16, an upper plate 63 that covers a top of the insertion and extraction port 17, and a cover plate 64 that covers a front side of the insertion and extraction port 17 and the front plate 12, the sheet body being formed to be generally substantially C-shaped. The insertion plate 62 is bent inward relative to the upper plate 63 with a bent portion therebetween to be thereby formed, and the cover plate 64 is bent inward relative to the upper plate 63 to be thereby formed.

The lid body 61 closes the insertion and extraction port 17 of the storage casing 10 in a manner to insert the insertion plate 62 between the back plate 13 and the sleeve casing 2 stored in the storage part 16 and to cause the cover plate 64 to cover the front plate 12 from outside. Over the counter sale, the storage casing 10 is put in a state, in which the insertion and extraction port 17 is closed by the lid body 61, and generally covered by a transparent or translucent heat shrinkable film to be made one package. As shown in FIG. 6, the lid body 61 does not close portions above the side plates 14, 15 and provides for exposed portions 65. The exposed portions 65 enable visual observation of articles stored in the storage part 16, that is, those sleeve casings 2, in which optical disks 1 in a stacked state are stored, so that, for example, a user can confirm the number of stored optical disks at the time of purchase. While the lid body 61 will be removed from the storage casing 10 and disposed of after being purchased by a user, it can be readily disposed of as combustible refuse since it is formed from cardboard, etc.

Figure 7:
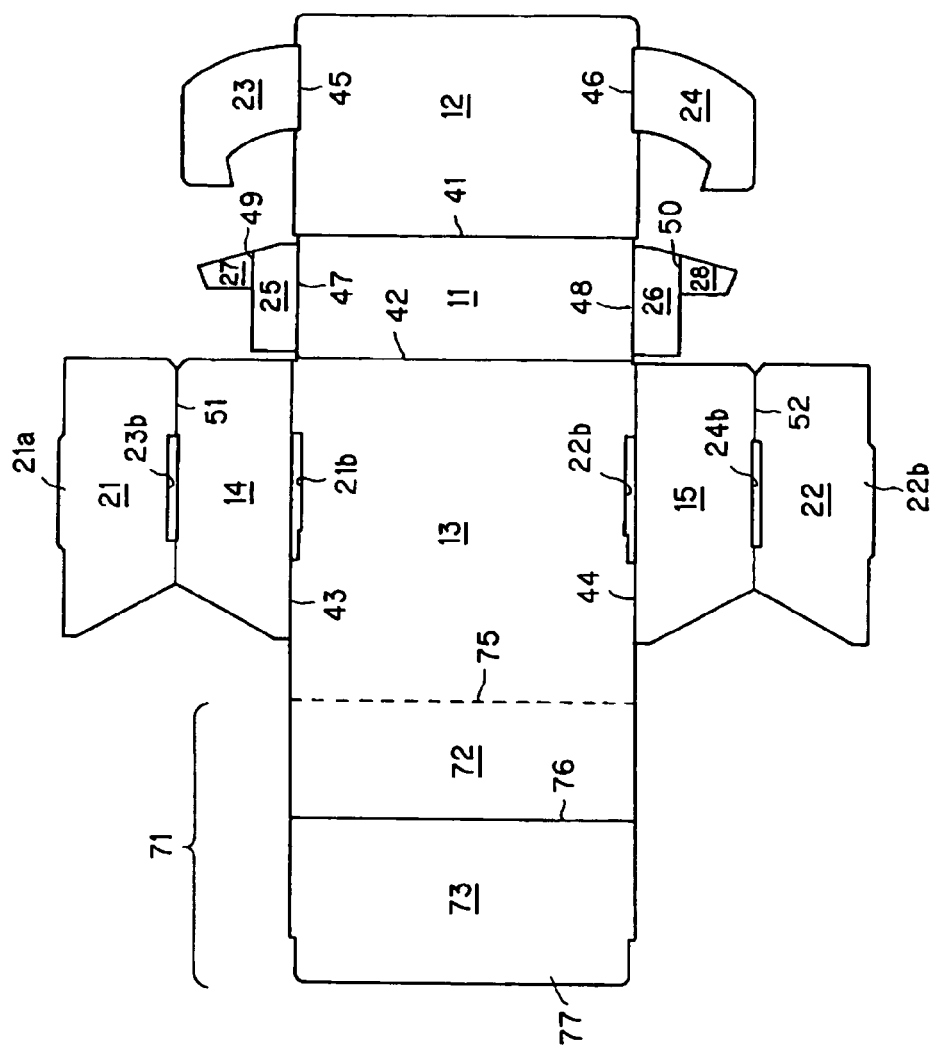
FIG. 7 is a development showing a lid body made integral with a storage casing.

The lid body 61 serving for closure of the insertion and extraction port 17 may be made integral with the storage casing 10 like a lid body 71 shown in FIG. 7. FIG. 7 is a development showing the lid body 71 made integral with the storage casing 10. The lid body 71 includes an upper plate 72 provided on that side of the back plate 13, which is in parallel to the second bent portion 42, to be contiguous to the back plate 13 to cover an upper surface of the insertion and extraction port 17, and a cover plate 73 contiguous to the upper plate 72. A perforated line 75 is defined between the back plate 13 and the upper plate 72 to make a folded portion when the insertion and extraction port 17 is closed, and to enable a user to cut off the lid body 71. A folded portion 76 is defined between the upper plate 72 and the cover plate 73 to make the cover plate 73 along the front plate 12 when the insertion and extraction port 17 is closed. Further, a tip end of the cover plate 73 makes an insertion portion 77, which is to be inserted inside the front plate 12.

Figure 8:
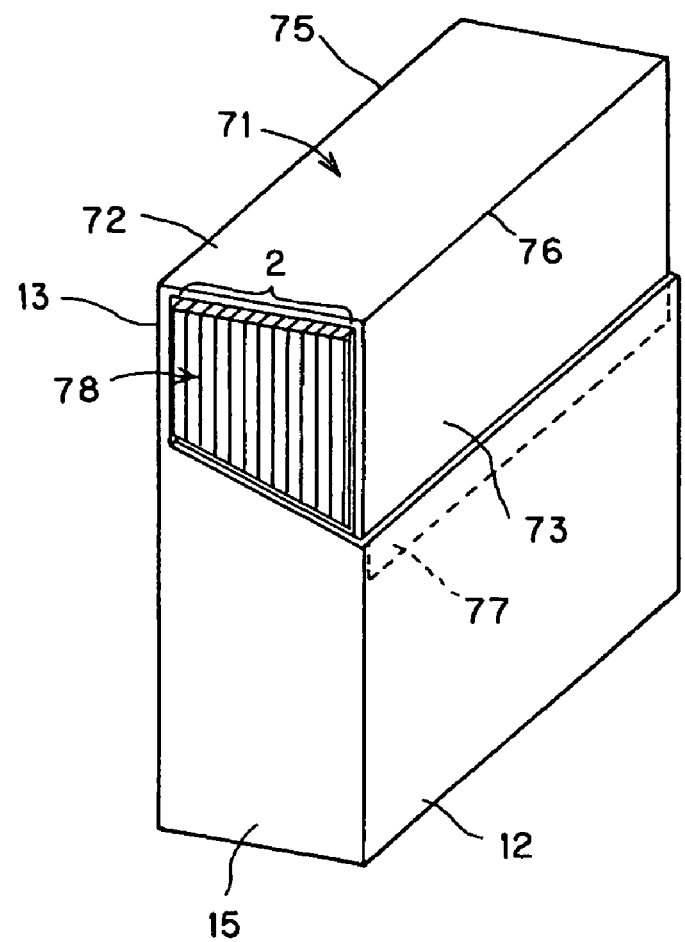
FIG. 8 is a perspective view showing a storage casing, with which a lid body is provided integrally.

After the storage casing 10 is assembled, the lid body 71 is folded at the perforated line 75, which is formed by perforations, or the like, toward the insertion and extraction port 17, the cover plate 73 is folded at the folded portion 76 to be put along the front plate 12, and the insertion portion 77 is inserted between the front plate 12 and the sleeve casing 2, whereby the insertion and extraction port 17 is closed. For sale, the storage casing is generally covered by a transparent or translucent heat shrinkable film to be made one package. At this time, the lid body 71, as shown in FIG. 8, does not close portions above the side plates 14, 15 and provides for exposed portions 78. The exposed portions 78 enable visual observation of articles stored in the storage part 16, that is, those sleeve casings 2, in which optical disks 1 in a stacked state are stored, so that, for example, a user can confirm the number of stored optical disks at the time of purchase. When the seal is broken by a user, the lid body 71 is cut off at the perforated line 75 to open the insertion and extraction port 17.

Since the lid body 71 is structured as a part of the sheet body 31, which constitutes the storage casing 10, it is not necessary to provide a lid body with a separate sheet body as in the lid body 61, thus enabling simplifying a manufacturing process.

Figure 9:
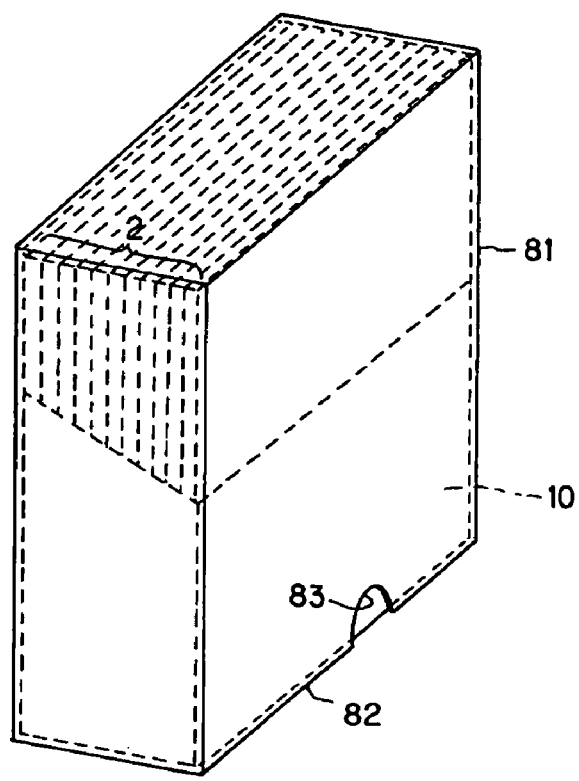
FIG. 9 is a perspective view showing a state, in which a storage casing is closed by a closed type lid body.

Further, a box-shaped lid body 81 may constitute a lid body for the storage casing 10 as shown in FIG. 9. The lid body 81 is formed to be able to cover the storage casing 10 wholly, and formed at a bottom surface thereof with an opening 82. The lid body 81 is fitted onto the storage casing 10 from above by the opening 82 to cover the outside of the storage casing 10 except for the bottom surface thereof, and generally covered by a transparent or translucent heat shrinkable film to be made one package for sale. Since the lid body 81 can cover the insertion and extraction port 17 wholly, it is possible to securely protect the optical disks 1 being stored articles and to prevent the optical disks and the storage casing 10 from being fouled by vibrations or the like at the time of transport. Also, a notch 83 is provided on at least one side of the lid body 81, which defines the opening 82, to facilitate removal of the lid body 81 from the storage casing 10. The lid body 81 is composed of a single sheet body such as cardboard or the like, so that it is easy to manufacture and readily disposed of.

What is claimed is:

1. A storage casing that stores therein a thin article in an upright position, the storage casing comprising:
    a bottom plate,
    a front plate coupled to the bottom plate with a first hinge, the hinge comprising a first bent portion along a first side of the bottom plate; and
    a back plate provided on the bottom plate comprising a second hinge comprising a second bent portion along a second side, the second side being opposed to the first side; and
    a pair of side plates coupled to the back plate,
    wherein the front plate further comprises turning pieces along the side plates,
    the bottom plate comprises turning restriction pieces along the side plates,
    the turning restriction pieces each comprise a first turning restriction portion on a side facing the back plate, wherein the first turning restriction portion engages with engaging parts of the turning pieces, and each comprise a second turning restriction portion on a side facing the front plate, wherein the second turning restriction portion engages with restriction portions provided on side edges of the side plates adjacent to the front plate,
    wherein when turning through the first hinge, the front plate can turn until the engaging parts of the turning pieces of the front plate engage with the first turning restriction portions, and
    wherein when turning through the second hinge, the back plate can turn until the restriction portions of the side plates engage with the second turning restriction portions.

2. The storage casing according to claim 1, wherein the side plates are provided with holding pieces that hold the turning pieces and the turning restriction pieces, the turning pieces are inserted between the side plates and the holding pieces from insertion ports provided on bent portions between the side plates and the holding pieces, and the restriction portions are provided inside the bent portions.

3. The storage casing according to claim 1, wherein the bottom plate, the front plate, the back plate, the pair of side plates, the turning pieces, and the turning restriction pieces are formed from a single sheet body.

4. The storage casing according to claim 3, wherein the side plates are provided with holding pieces that hold the turning pieces and the turning restriction pieces, the turning pieces are inserted between the side plates and the holding pieces from insertion ports provided on bent portions between the side plates and the holding pieces, and the restriction portions are provided inside the bent portions.

5. The storage casing according to claim 4, wherein the holding pieces comprise latch portions at the tip ends of the holding pieces, wherein the latch portions are latched in latch holes formed on bent portions of the side plates and the back plate.

6. The storage casing according to claim 1, wherein an insertion and extraction port for thin articles, provided on a top, an upper portion of the front, and upper portions of both sides is closed by a lid body, and the lid body closes the top and the upper portion of the front.

7. The storage casing according to claim 6, wherein the lid body is integrally formed with the back plate through a bent portion.

8. The storage casing according to claim 3, wherein the sheet body is formed from cardboard.

9. The storage casing according to claim 1, wherein the thin article comprises an optical information recording medium.

10. A method of assembling a storage casing that stores therein a thin article in an upright position, the storage casing comprising a bottom plate, a front plate coupled to a first side of the bottom plate with a first bent portion therebetween, a back plate provided on a second side of the bottom plate opposed to the first side with a second bent portion therebetween, a pair of side plates provided on third and fourth sides of the back plate adjacent to the second bent portion with third and fourth bent portions therebetween, turning pieces provided on fifth and sixth sides adjacent to the first bent portion of the front plate with fifth and sixth bent portions therebetween, and comprising engaging parts on the tip ends thereof and turning restriction pieces on seventh and eight sides adjacent to the first and second sides of the bottom plate with seventh and eight bent portions therebetween, and comprising restriction pieces on the tip ends thereof, with ninth and tenth bent portions in parallel to the seventh and eight bent portions, therebetween, and holding pieces provided on the side plates with eleventh and twelfth bent portions in parallel to the third and fourth bent portions, therebetween, and wherein the third and fourth bent portions comprise latch holes, and the eleventh and twelfth bent portions comprise insertion ports, the method comprising:

bending the turning restriction pieces at the seventh and eight bent portions and bending the restriction pieces at the ninth and tenth bent portions to form folds;

bending the pair of side plates at the third and fourth bent portions;

bending the back plate at the second bent portion so that the turning restriction pieces are positioned inside the side plates;

bending the holding pieces at the eleventh and twelfth bent portions so as to surround the turning restriction pieces to put the restriction pieces formed with the folds in a state of being separate from the side plates;

bending the turning pieces at the fifth and sixth bent portions and bending the front plate at the first bent portion and inserting the bent turning pieces from the insertion ports of the eleventh and twelfth bent portions, further folding the bent holding pieces at the eleventh and twelfth bent portions, and latching latch portions of the holding pieces in the latch holes of the third and fourth bent portions.

* * * * *